United States Patent [19]

Buller-Colthurst

[11] 4,322,874

[45] Apr. 6, 1982

[54] MULTIPLE STICK FOR SMOKE HOUSE

[75] Inventor: Guy E. Buller-Colthurst, Rexdale, Canada

[73] Assignee: Knud Simonsen Industries Limited, Rexdale, Canada

[21] Appl. No.: 150,303

[22] Filed: May 16, 1980

[51] Int. Cl.³ .......................................... A22C 15/00
[52] U.S. Cl. ................................................... 17/44.4
[58] Field of Search ...................... 17/44.2, 44.3, 44.4, 17/44

[56] References Cited

U.S. PATENT DOCUMENTS

| | | | |
|---|---|---|---|
| 336,123 | 2/1886 | Leggitt | 17/44.3 |
| 552,358 | 12/1895 | Euphrat | 17/44.3 |
| 1,948,839 | 2/1934 | Benn | 17/44.2 |
| 2,643,777 | 6/1953 | Pickens, Sr. | 17/44.4 X |
| 3,011,650 | 12/1961 | Engelhorn et al. | 17/44.2 X |
| 3,594,858 | 7/1971 | Simonsen | 17/44.4 |
| 3,792,508 | 2/1974 | Simonsen et al. | 17/44.4 |
| 3,982,300 | 9/1976 | Soikie | 17/44.4 |

Primary Examiner—Willie G. Abercrombie
Attorney, Agent, or Firm—George A. Rolston; William F. Frank

[57] ABSTRACT

A processing chamber having a predetermined cross-sectional area, and an overhead conveyor system extending therethrough, the conveyor system incorporating a plurality of movable support members or trollies, and a plurality of generally downwardly dependent carrier members extending from the conveyor system at spaced apart intervals therealong at least some of the carrier members having at least two releasable attachment means thereon vertically spaced apart from one another a predetermined distance, and there being a plurality of meat product hanger members, one meat product hanger member being releasably attachable to a said attachment means, and each of the meat product hanger means being adapted to support a predetermined load quantity of meat products, in spaced apart relation from other meat products supported on the other meat product hanger members, whereby on at least some of the carrier members, the meat products may be supported in separate load quantities, in vertically spaced apart relation from one another, thereby substantially filling the cross-sectional area of the chamber. The invention also comprises a novel method of operating a side-loading meat processing apparatus.

4 Claims, 9 Drawing Figures

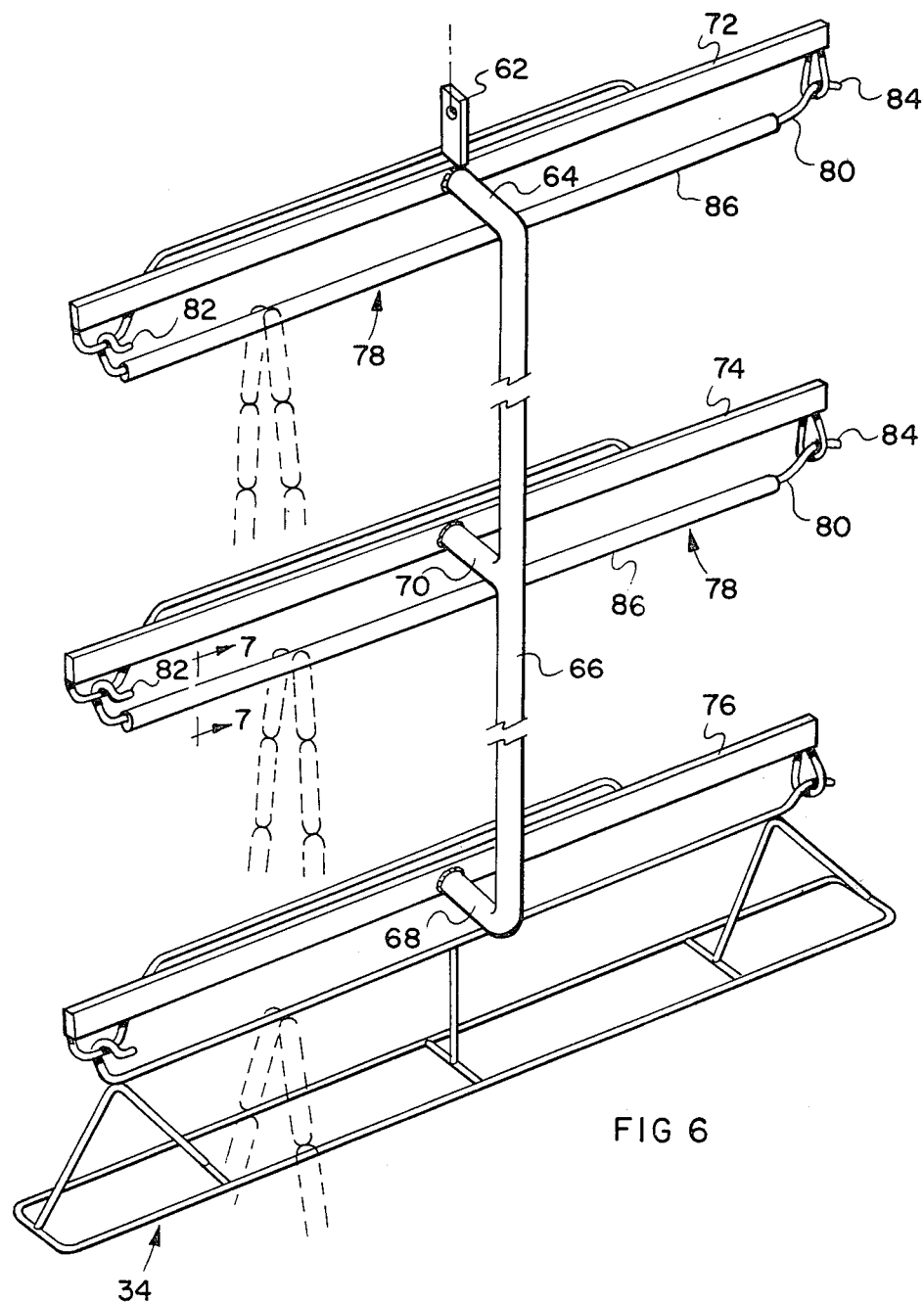
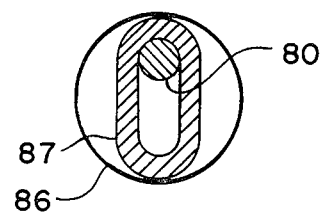
FIG 6
FIG 7

MULTIPLE STICK FOR SMOKE HOUSE

The invention relates to hangers for processing of meat products on conveyor systems, and is particularly concerned with such hangers for use in meat processing chambers such as smoke houses, ovens, and the like.

BACKGROUND OF THE INVENTION

Processed meat products such as sausage products, and certain other kinds of processed meat products are usually treated in smoke houses or ovens on a continuous basis.

Such smoke houses or ovens are simply elongated tunnel-like chambers, which may be straight, or may be arranged with several curves or bends, depending upon the layout of the plant, and are provided with overhead conveyor systems for transporting the meat products slowly through the chamber.

In the majority of cases, for the sake of convenience and flexibility the overhead conveyor system is a single rail and chain system, so that it can most easily follow a curved path.

Within the chamber various different processes may be carried out. For example, the meat products may be washed or subjected to steam treatment, they may be partially cooked, and they may be subjected to a smoke treatment or a liquid smoke i.e. a water spray incorporating a solution providing a smoke-like flavour to the products, and/or chilled.

Such chambers are provided with a loading station at the inlet end and an unloading station at the outlet end, with the meat products being loaded and unloaded more or less continuously.

In order to support the meat products on the conveyor system, a system of hanger bars is provided. Such hanger bars are disclosed, for example, in U.S. Patent Nos. 3,594,858, 3,792,508, and 3,982,300, all of which are owned by Knud Simonsen Industries Limited.

The various different forms of hangers disclosed in such Patents have proved to be highly satisfactory, and have achieved wide acceptance, and provide practical and effective solutions to many of the problems in the design of such hangers for handling a variety of meat products.

There are, however, certain limitations on their use.

For example, the meat products, usually sausages such as weiners and the like, are loaded onto the hangers more or less completely by hand, and the hangers must then be lifted by hand and placed in position.

For convenience, and in fact for practical operation, it is therefore not possible to go above a certain predetermined maximum weight that can be loaded on each hanger.

This means therefore that the size of the oven or processing chamber is also subject to certain limitations. Thus the interior width and height of the chamber are more or less dependent upon the space occupied by the meat products loaded on a single hanger. In addition, the length of any such chamber for processing will be dependent upon the type of processing being carried out and the speed of operation. Thus, a greater production from a given installation cannot be practically achieved, simply by making the installation longer. In order to do this, the speed of transporting the meat products through the oven would have to be greatly increased, which brings in numerous other problems.

However, it is clearly desirable from the viewpoint of building an economical installation, that the size of the oven or chamber should be increased so that a greater production volume of meat products can be put through it in a given time.

The cost of simply building a larger oven or chamber may be relatively minor. In many cases it will be possible to use the same control systems, and air circulating fans, pumps and the like will simply be increased in capacity, without any major increase in construction costs.

In addition, in many cases, labour costs will not increase notwithstanding the larger size and handling capacity of the chambers.

As stated, however, the major problem in designing a larger installation is the practical limits imposed at the loading or input end of the oven, where each hanger must be individually manually loaded. A normal hanger load of such meat products will only occupy a certain cross-sectional area of oven, and simply increasing the dimensions of the oven will not enable a larger hanger load to be handled manually.

Accordingly, with a view to overcoming the foregoing problems and disadvantages, the present invention comprises the provision of an oven or processing chamber having a greater cross-sectional area, and an overhead conveyor system extending therethrough, said conveyor system incorporating a plurality of movable support members or trollies, and a plurality of generally downwardly dependent carrier members extending from said conveyor system at spaced apart intervals therealong at least some of said carrier members having at least two releasable attachment means thereon vertically spaced apart from one another a predetermined distance, and there being a plurality of meat product hanger members, one said meat product hanger member being releasably attachable to a said attachment means, and each of said meat product hanger means being adapted to support a predetermined load quantity of meat products, in spaced apart relation from other meat products supported on other said meat product hanger members whereby on at least some of said carrier members, said meat products may be supported in separate load quantities, in vertically spaced apart relation from one another, thereby substantially filling the cross-sectional area of said oven chamber.

More specifically the invention comprises such carrier members, and spaced apart upper and lower attachment means thereon, with one of said attachment means being vertically offset with respect to the other of said attachment means, whereby to balance the load of meat products on a said carrier member.

The invention may further comprise a said carrier member having two attachment means, one of said attachment means being lower than the other, and located in spaced apart vertical planes, whereby meat products hanging thereon are displaced from one another.

The invention may further comprise a said carrier member having three said attachment means thereon in vertically spaced apart relation.

The invention further comprises that the meat product hanger members may be readily releasable from said carrier members, and the oven chamber will preferably incorporate automatic disengagement means for releasing as aforesaid.

It will of course be appreciated that such an oven chamber will be provided with the usual air circulation systems, and air heating and humidifying means, and steam discharge and/or water sprays, and may be provided with smoke distribution systems or liquid smoke sprays, and such systems will be provided at different zones spaced along the length of the oven whereby to provide any desired treatment for such meat products in a continuous and controllable manner.

The invention not only embraces the processing plant itself and also the new hanger system and the carriers used therein, but also provides a novel method of operating a sideloading meat processing apparatus.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 6 is a perspective illustration of an alternative embodiment of a carrier in accordance with this invention;

FIG. 7 is a section taken along the line 7—7 of FIG. 6;

DESCRIPTION OF SPECIFIC EMBODIMENTS

As explained above, the invention is employed in the construction and operation of meat processing chambers, ovens or apparatus, of a general type which are well known in the art such as are generally disclosed, for example, in U.S. Pat. Nos. 3,594,858, 3,792,508 and 3,982,300. Such chambers are simply elongated tunnel-like structure or series of structures, of sheet metal, usually incorporating thermal insulation and having a central overhead rail conveyer system, and air circulating systems including ducts, fans and dampers for controlling and regulating air flow, and incorporating either air heating or steam heating means for heating the chamber at various locations along its length, and incorporating water sprays, to which may be mixed liquid smoke or other treatment materials, and having in some cases smoke generators, for providing a smoke treatment to the meat products, and may also incorporate air conditioning means and even a chilling zone in some cases.

As explained above, the construction details and facilities and controls incorporated in such an oven are largely dependent upon the particular processing techniques to be carried out, and are in any event well known in the art.

For this reason, such details are omitted from the present explanation, it being understood that any or all of them may be incorporated depending upon the engineering requirements.

Figure 1:
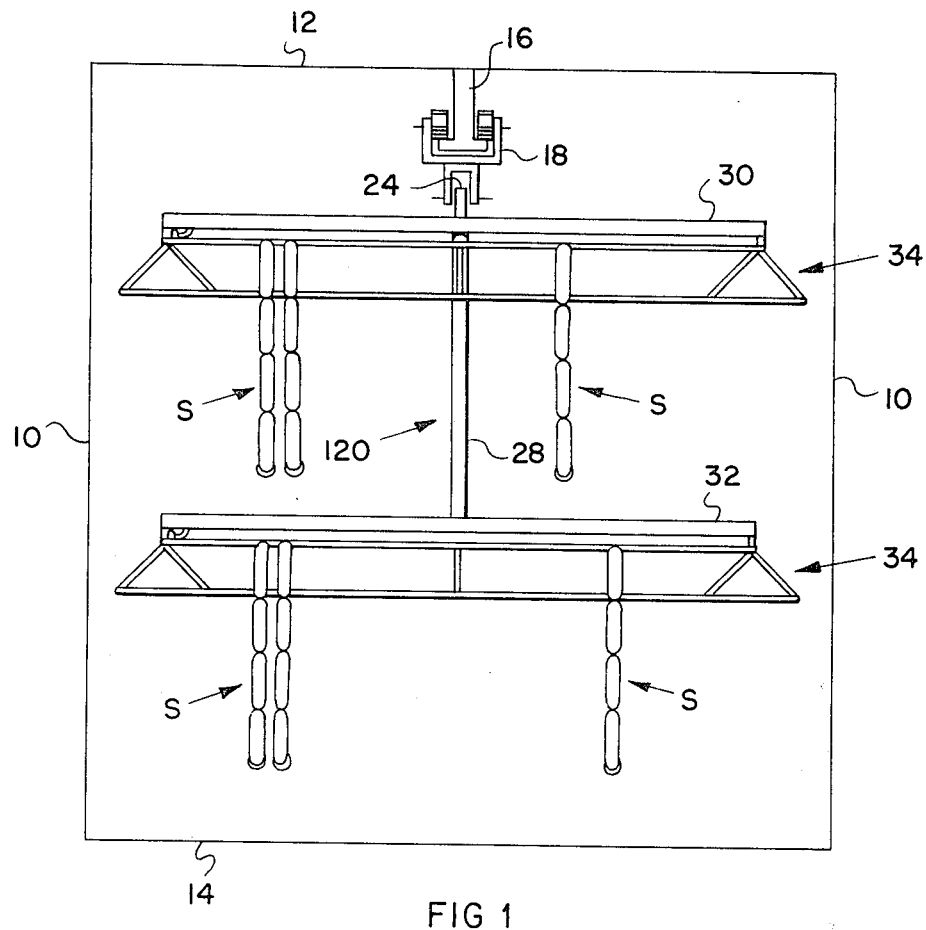
FIG. 1 is a schematic cross-section through a typical oven, showing the carriers according to the invention in position therein with meat product-carrying hangers supported by such carriers.

Referring now to FIG. 1, it will be seen that the oven chamber is represented schematically by the side walls 10 and the top wall 12, and bottom wall 14, which together will define a predetermined cross-sectional area which in most cases will be essentially regular or uniform along the length of the oven chamber.

Figure 8:
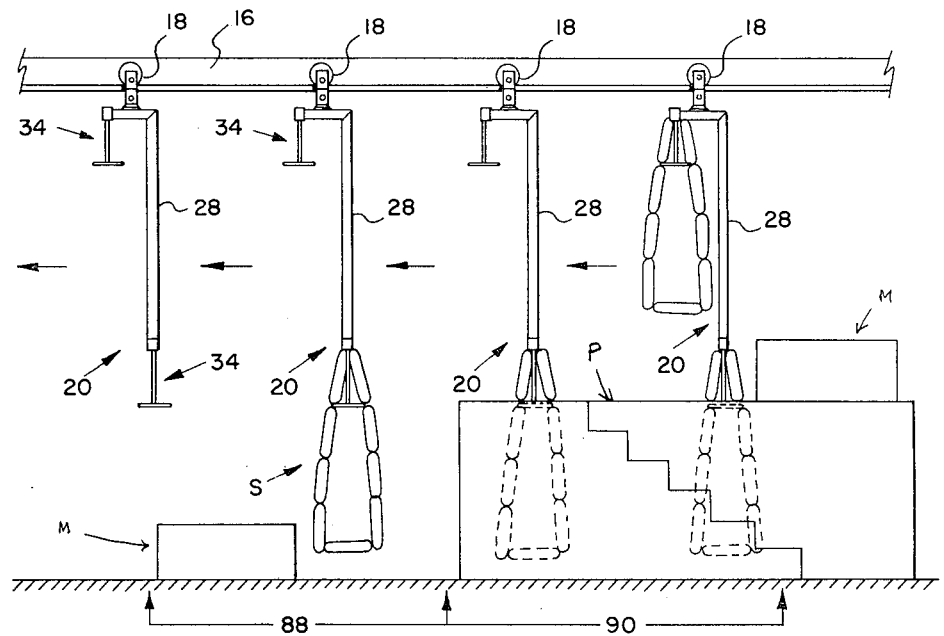
FIG. 8 is a fragmentary side elevation showing two separate loading stations at which meat product-carrying hangers are attached to the carriers; and, FIG. 9 is a fragmentary side elevation similar to that of FIG. 8 but showing an alternative embodiment of the invention.
Figure 9:
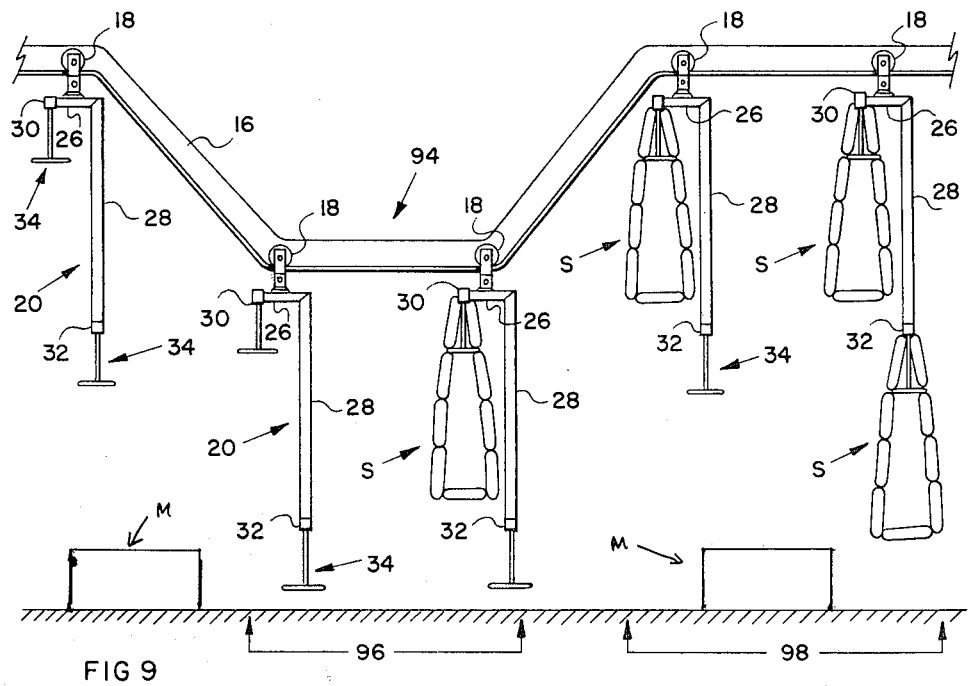

Along the upper wall 12 of the chamber is provided a continuous monorail conveyor 16 having a series of wheeled trollies 18 joined together by a chain 19 (FIGS. 8 and 9). Any suitable drive system may be provided for driving the conveyor system, all of which details are well known in the art and require no description.

It will of course be appreciated that while this description shows such a standard form of monorail conveyor system utilizing wheeled trollies, any other conveyor system that is suitable for the purpose may be used.

From each of the trollies 18, there is provided a downwardly dependent carrier generally indicated at 20. The carrier 20 is swingably mounted as at 22 on the trolley, so that it may swing in a forward and backward direction relative to the trolley, although in practice it will normally remain more or less dependent in a vertical manner.

The carrier 20 comprises an upper central neck portion 24, to which is attached a short cross-member 26, normally lying in a more or less horizontal plane. At one end of cross member 26 there is attached a downwardly dependent leg member 28 which extends downwardly a predetermined distance into the lower portion of the oven chamber.

The cross-member 26 extends longitudinally along the axis of the oven, so that in fact its two ends are spaced apart in two vertical planes, one behind the other.

An upper support bar 30 is attached transversely on the free end of cross bar 26 and a lower support bar 32 is attached transversely on leg member 28.

The length of the T-shaped cross-member is relatively small, so that the actual space established between such two vertical planes is just sufficient to receive a regular load or string of meat products, but is not so great as to constitute a major waste of space.

As shown in FIG. 1, a so-called "stick" or meat product hanger generally indicated at 34 is carried on both the support bar 30 and the support bar 32, with a load of meat products, in this case sausages, being supported on each such hanger.

It will be noted that the length of leg 28 is such as to establish a sufficient vertical spacing between the two hangers 34, such that there is adequate space for the meat products S on the upper hanger 34 to hang downwardly without interfering with the lower hanger 34 or the leg 28.

Figure 3:
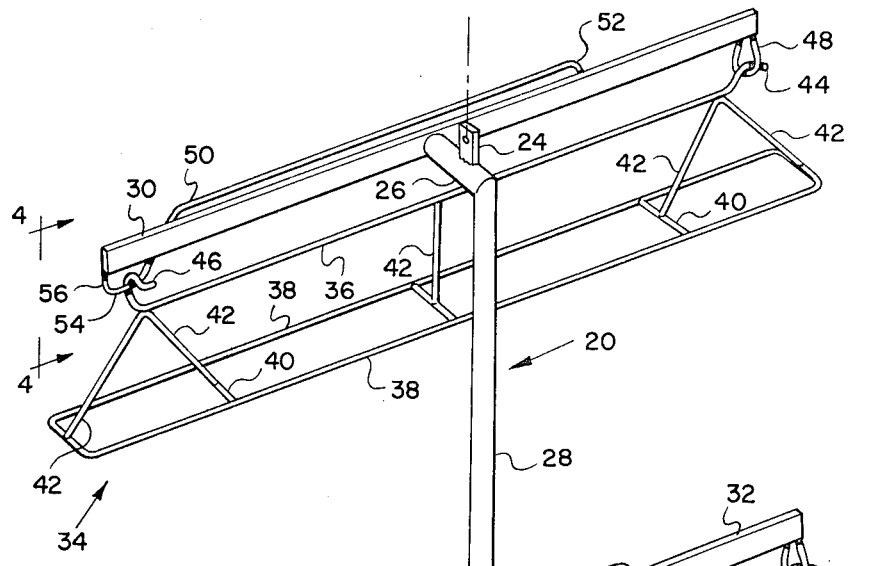
FIG. 3 is an enlarged perspective showing one embodiment of a carrier according to the invention with hangers supported thereon.
Figure 4:
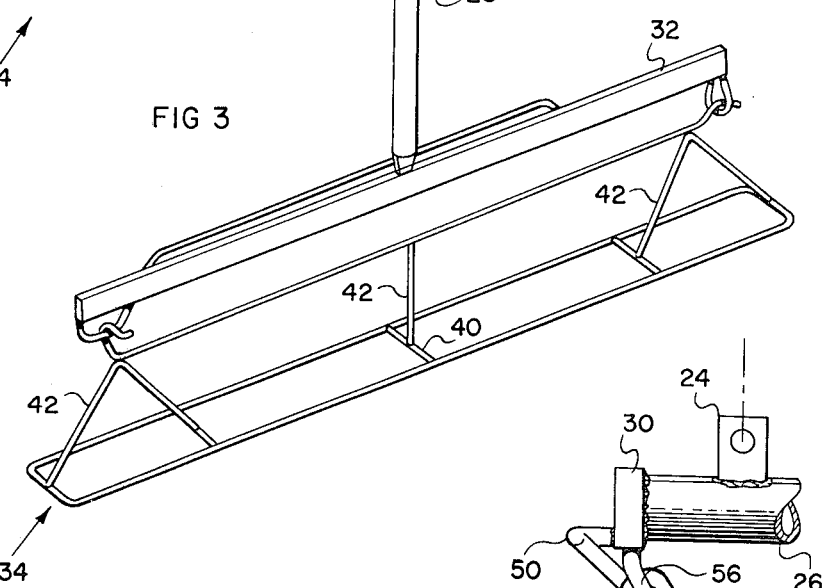
FIG. 4 is a fragmentary end view along the arrow 4 of FIG. 3.
Figure 5:
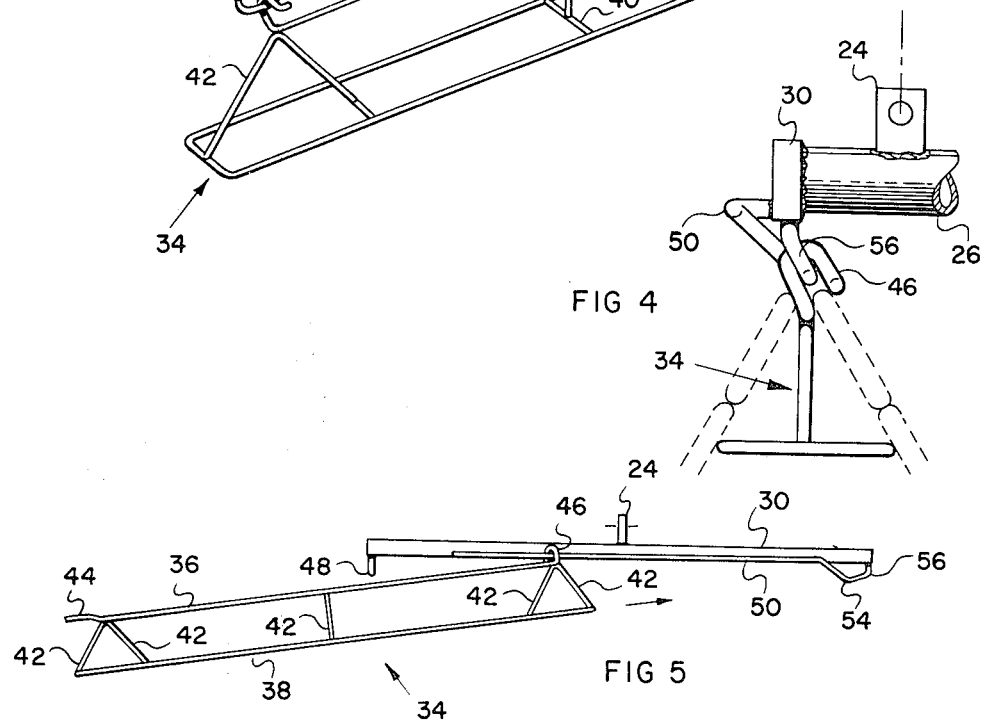
FIG. 5 is a front elevational view, showing a hanger in the process of being attached to one of the support bars of the carrier.

As shown in more detail in FIG. 3, each of the hangers 34 are made essentially as shown in U.S. Pat. No. 3,982,300. Each such hanger member 34 comprises an upper hanger rail 36 and two spaced apart lower spacer rails 38. Cross-members 40 extend between spacer rails 38, and support rods 42 extend between upper rail 36 and the cross members 40, and additional such support rods 42 at each end extend between the ends of the upper rail 36, and the adjacent ends of lower spacer rails 28, which are joined at either end of the hanger.

At one end, the upper hanger rail 36 is provided with a terminal pin 44 extending outwardly at one end and a generally inverted U-shaped hook member 46 at the other end.

Each of such hangers 34 is releasably attachable on respective upper and lower support bars 30 and 32, essentially in the manner shown in U.S. Pat. No. 3,982,300.

For that purpose, each of such support bars 30 and 32 is provided with a downwardly dependent eye 48 at one end, for receiving the pin 44.

Extending along most of the length of and beside the support bar, is a slide rail 50, which is simply provided with an L-shaped end 52 welded to an intermediate portion of such support bar and at the other end of the slide rail 50, there is provided a generally V-shaped angled notch or catch 54, the free end 56 of the rail 50 being welded to the support bar.

In operation, the conveyor will be continuously moving and empty hangers will arrive at the loading station supported by the hook 46 linked in the catch 54, and the pin 44 located in the eye 48, having been placed in position after unloading at an unloading station (not shown).

The operator will then remove an empty hanger and will introduce each hanger into a string or batch of linked sausages arranging those sausages on the hanger as shown in the drawings, with the upper rail 36 of the hanger engaging the portions of skin between the sausages and with loops of sausages hanging downwardly around the lower rails 38. The operator will then raise the loaded hanger 34 and will place the hook 46 over the slide rail 50 of the upper support bar 30 at or close to its L shaped end 52. He will then push the hanger 34 so that the hook 46 slides along the slide rail 50 and drops into the notch or catch 54. He will then push the hanger 34 slightly further, raise the hanger 34 until the pin 44 is aligned with the eye 48 and finally, draw it slightly back toward himself, to introduce the pin 44 into the eye 48.

Figure 2:
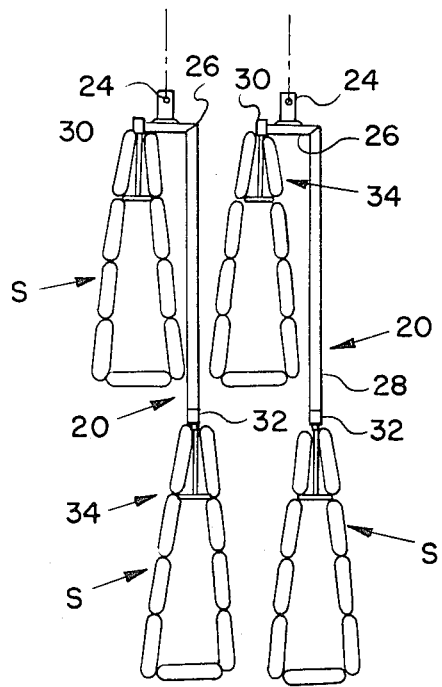
FIG. 2 is a schematic and fragmentary side elevation of the carriers and hangers shown in FIG. 1.

The next operator will then secure, in the same manner, a hanger 34 similarly loaded with sausages to the lower support bar. Reference to FIG. 2 will show that the sausages hanging from the hanger on the upper support bar 30 are clear of the carrier leg 28 and are disposed upwardly of the hanger on the lower support bar 32.

At an unloading station, the sausages can be removed from the hangers by disengaging the hanger pin 44 from the respective eye 48 and unhooking the catch 54 and allowing the sausages to slide from the hanger. The hanger 34 is then reattached to the eye 48 and the catch 54 at the unloading station and is thus conveyed to the loading station, ready to be re-loaded as described above.

It will now be understood that this invention permits a greater production while avoiding the handling of excessively heavily loaded hangers. It will also be noted that with upper and lower support bars 30 and 32 respectively disposed sides of the suspension tongue or neck 24, the weight of the sausages supported on the upper and lowwer hangers are counter-balanced so allowing such sausages to hang generally vertically.

Reference will next be made to FIGS. 6 and 7 in which there is shown an alternative embodiment of a carrier in accordance with this invention, as well as the alternative use on such a carrier, of single bar hangers.

The carrier generally indicated at 60 in FIG. 6 comprises a neck 62 for suspending the carrier from the conveyor and secured to one end of a short upper cross member 64. The other end of the cross member 64 is secured to a downwardly dependent leg 66 which, at its lower end, is secured to a short lower cross member 68. An intermediate cross member 70 is secured to the leg 66 between the upper and lower cross members 64 and 68 respectively. Upper, intermediate and lower support bars 72, 74 and 76 respectively are secured to respective ones of the upper, intermediate and lower cross members 64, 70 and 68 on the same side of the leg 66 so as to be essentially co-planar with the neck 62, so that, in turn, when hangers carrying a meat product such as sausages, are supported on those support bars, the carrier 60 will adopt an essentially vertical position.

The lower support bar 76 is shown in FIG. 6 as supporting a hanger 34 of the type already described herein whereas the other two support bars 72 and 74 are shown as carrying simplified hangers 78, each of which comprises a core rod 80 terminating in a hook 82 and a pin 84 for attaching such hangers to the carrier in the manner already described. A generally cylindrical sleeve 86 surrounding the core rod 80 and supports the meat products. At each end 87 it is pinched (see FIG. 7) and welded to rod 80.

In view of the different heights of the support bars provided on a carrier in accordance with this invention, it is necessary to provide suitable means for loading sausage-carrying hangers onto the carriers. In the arrangement shown in FIG. 8, two separate loading stations 88 and 90 are provided.

At the first loading station 88, the empty hangers 34 supported on the lower support bars 32 of the carriers 20 are removed by a first operator and the loaded hangers are attached to the lower support bars 32 in the manner already described.

An elevated platform 92 is provided at the second loading station 90 and a second operator working on that platform is able to unload empty hangers and to attach loaded hangers to the upper support bars 30 of the carrier.

An alternative arrangement is shown in FIG. 9. In that arrangement, the conveyor 16 is provided with a lowered reach 94 to permit loading at a first loading station 96 of sausage-carrying hangers on the upper support bars 30 without the use of an elevated loading station. Loaded hangers can then be attached to the lower support bars 32 at a second loading station 98 which is also at floor level.

In both arrangements each operator station is provided with a typical sausage stuffing machine M of a type well known in the art.

Such stuffing machines M are represented schematically although it will of course be appreciated that the precise location will in fact be to one side of the conveyor rail so that the operator will stand between the stuffing machine M, and the conveyor rail, and will load the hanger onto the supporting means from the side.

In the embodiment shown in FIG. 8, the first stuffing machine or meat product forming device M is located at floor level, so that the first operator can load the lower most hanger 34, and the second sausage stuffing machine M is located on an elevated platform indicated as P where another operator can load the upper hanger 34.

In the embodiment of FIG. 9 by the use of the lower reach 94 of the conveyor rail, loading can proceed in the opposite manner with the first operator loading the upper most hanger 34, while the support means and trolley are on the lower reach 94. A second operator also operating on the same ground or floor level as the first operator can then load the lower hanger 34 from the second sausage stuffing machine M.

The foregoing is a description of a preferred embodiment of the invention and is given by way of example only. The invention is not to be taken as restricted to any of the specific features or details described, but comprehends all such variations thereof as come within the scope of the appended claims.

What is claimed is:

1. A hanger system for supporting meat products such as sausages and the like on a moving conveyor system during curing and the like wherein such meat products are supported on hangers which in turn are releasably carried transversely of the path of movement of such conveyor system by support bars suspended from such conveyor system, said hanger system comprising:

overhead conveyor means defining a conveyor movement path;

a plurality of carriers on said overhead conveyor means in spaced apart relation along said path, each of said carriers comprising;

a generally horizontal upper cross member having two ends, extending lengthwise along such conveyor path;

a generally vertical leg portion extending downwardly from one end of said cross member;

a lower transverse support bar attached to the lower end of said leg portion extending transversely of such conveyor path;

an upper transverse support bar attached to the free end of said cross member remote from said leg portion extending transversely of such conveyor path, thereby locating said upper support bar vertically spaced apart, and spaced apart along such conveyor path relative to such lower support bar;

attachment means on said support bars for releasably securing hangers thereto so that meat products supported on a said hanger secured to one of said support bars are suspended in vertically spaced apart relationship to meat products supported on a hanger secured to the other said support bar, and are located transversely relative to such conveyor path and spaced apart along such conveyor path; and, suspension means on said cross member intermediate said ends whereby said carrier may hang substantially vertical when carrying meat products on both said support bars.

2. A hanger system as claimed in claim 1 wherein said attachment means include a loop member at one end of each said support bar, for cooperating with a said hanger, for releasably securing one end thereof.

3. A hanger system as claimed in claim 2 wherein said attachment means further include a rod portion attached to and located in parallel spaced apart relation from each said support bar, said rod member being formed with a downwardly dependent bend portion at one end thereof, said bend portion being located at the opposite end of said support bar from said loop member, and being adapted to cooperate with said hanger for attachment of the other end thereof.

4. A hanger system as claimed in claim 1 including a carrier suspension member pivotally connected to said overhead conveyor means and in which said support bars are disposed on opposite sides of said suspension member so that, when hangers with meat products suspended therefrom are secured to such support bars, the weights of such meat products are essentially counterbalanced so as to cause such meat products to hang generally vertically.

* * * * *